US010006315B2

(12) United States Patent
Thompson et al.

(10) Patent No.: US 10,006,315 B2
(45) Date of Patent: Jun. 26, 2018

(54) SYSTEM AND METHOD FOR IMPROVED CONTROL OF A COMBINED CYCLE POWER PLANT

(71) Applicant: General Electric Company, Schenectady, NY (US)

(72) Inventors: Brett Matthew Thompson, Greenville, SC (US); Michael Joseph Alexander, Schenectady, NY (US); Matthew John Mosley, Simpsonville, SC (US); Steven Di Palma, Schenectady, NY (US); Paul Jeffrey Mitchell, Greenville, SC (US); Justin Aaron Allen, Greenville, SC (US); Kihyung Kim, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 680 days.

(21) Appl. No.: 14/229,625

(22) Filed: Mar. 28, 2014

(65) Prior Publication Data

US 2015/0275703 A1 Oct. 1, 2015

(51) Int. Cl.
*F01K 23/10* (2006.01)
*F01K 23/18* (2006.01)
(Continued)

(52) U.S. Cl.
CPC ............ *F01K 23/101* (2013.01); *F01K 23/18* (2013.01); *F02C 6/00* (2013.01); *F02C 6/18* (2013.01);
(Continued)

(58) Field of Classification Search
CPC ...... F02C 9/28; F02C 9/26; F02C 9/44; F02C 9/20; F02C 9/16; F02C 9/48; F02C 9/50;
(Continued)

(56) References Cited

U.S. PATENT DOCUMENTS 3,956,883 A * 5/1976 Anderson ............... F01D 19/00
290/40 R
4,813,226 A * 3/1989 Grosselfinger ........... F02C 9/54
60/235
(Continued)

FOREIGN PATENT DOCUMENTS

| CN | 102859147 A | 1/2013 |
|----|-------------|--------|
| CN | 103511086 A | 1/2014 |

(Continued)

OTHER PUBLICATIONS

U.S. Appl. No. 13/798,044, filed Mar. 12, 2013, Kihyung Kim.

(Continued)

*Primary Examiner* — Brian D Nash
(74) *Attorney, Agent, or Firm* — Fletcher Yoder, P.C.

(57) ABSTRACT

Systems, methods, and tangible non-transitory machine readable medium are provided. A system includes a gas turbine system configured to produce power by combusting a fuel. The system further includes a controller configured to control the gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimentionsal surface area or on the limits.

17 Claims, 8 Drawing Sheets

(51) Int. Cl.
*F02C 6/00* (2006.01)
*F02C 7/057* (2006.01)
*F02C 9/48* (2006.01)
*G05B 15/02* (2006.01)
*F02C 6/18* (2006.01)
*F02C 9/50* (2006.01)

(52) U.S. Cl.
CPC ............... *F02C 7/057* (2013.01); *F02C 9/48* (2013.01); *F02C 9/50* (2013.01); *G05B 15/02* (2013.01); *F05D 2220/32* (2013.01); *F05D 2220/72* (2013.01); *F05D 2270/303* (2013.01); *F05D 2270/3032* (2013.01); *F05D 2270/331* (2013.01); *F05D 2270/44* (2013.01); *Y02E 20/16* (2013.01)

(58) Field of Classification Search
CPC .......................... F02C 9/54; F02C 6/18; F05B 2270/00–2270/337; F23N 2041/20; Y02E 20/16; F01K 23/10
See application file for complete search history.

(56) References Cited

U.S. PATENT DOCUMENTS

| | | | |
|---|---|---|---|
| 5,412,936 A | 5/1995 | Lee et al. | |
| 6,226,974 B1* | 5/2001 | Andrew | F02C 9/28 60/772 |
| 6,865,890 B2* | 3/2005 | Walker | F02C 3/30 60/39.3 |
| 7,219,040 B2* | 5/2007 | Renou | F02C 9/28 700/177 |
| 7,621,133 B2 | 11/2009 | Tomlinson et al. | |
| 7,698,004 B2* | 4/2010 | Boyden | G05B 13/027 422/177 |
| 8,195,339 B2* | 6/2012 | Long | G05B 17/02 60/646 |
| 8,352,148 B2* | 1/2013 | D'Amato | G05B 13/048 60/646 |
| 9,103,279 B2* | 8/2015 | Zhang | F02C 9/00 |
| 2009/0158738 A1 | 6/2009 | Hu et al. | |
| 2011/0160979 A1 | 6/2011 | Muller | |

FOREIGN PATENT DOCUMENTS

| | | |
|---|---|---|
| JP | 2001-197789 A | 7/2001 |
| JP | 4118301 B2 | 7/2008 |
| JP | 2008-259366 A | 10/2008 |

OTHER PUBLICATIONS

Machine Translation and First Office Action and Search issued in connection with corresponding CN Application No. 201510363692.0 dated Aug. 14, 2017.

* cited by examiner

SYSTEM AND METHOD FOR IMPROVED CONTROL OF A COMBINED CYCLE POWER PLANT

BACKGROUND OF THE INVENTION

The subject matter disclosed herein relates to combined cycle power plants, and more specifically, a system and method for improved flexible control of a combined cycle power plant.

Combined cycle power plants combine gas turbine systems with steam turbine systems to produce electricity while reducing energy waste. In operation, the gas turbine systems combust a fuel-air mixture to create torque that drives a load, such as an electrical generator. In order to reduce energy waste, the combined cycle power plants use the thermal energy in the gas turbine system exhaust gases to create steam. The steam travels through a steam turbine system creating torque that drives a load such as an electrical generator. Unfortunately, electrical grids may receive power from a variety of sources, increasing the number of times a combined cycle power plant turns on and off (i.e., supplies power to the electrical grid) depending upon demand. It would be beneficial to improve control of the combined cycle power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system is provided. The system includes a gas turbine system configured to produce power by combusting a fuel. The system further includes a controller configured to control the gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimentionsal surface area or on the limits.

In a second embodiment, a tangible non-transitory machine readable medium including instructions is provided. The instructions include instructions for controlling a gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimentionsal surface area or on the limits. The instructions additionally include instructions for displaying a graphical user interface (GUI) screen having the operating 2-dimensional surface area.

In a third embodiment, a method is provided. The method includes controlling a gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimentionsal surface area or on the limits.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
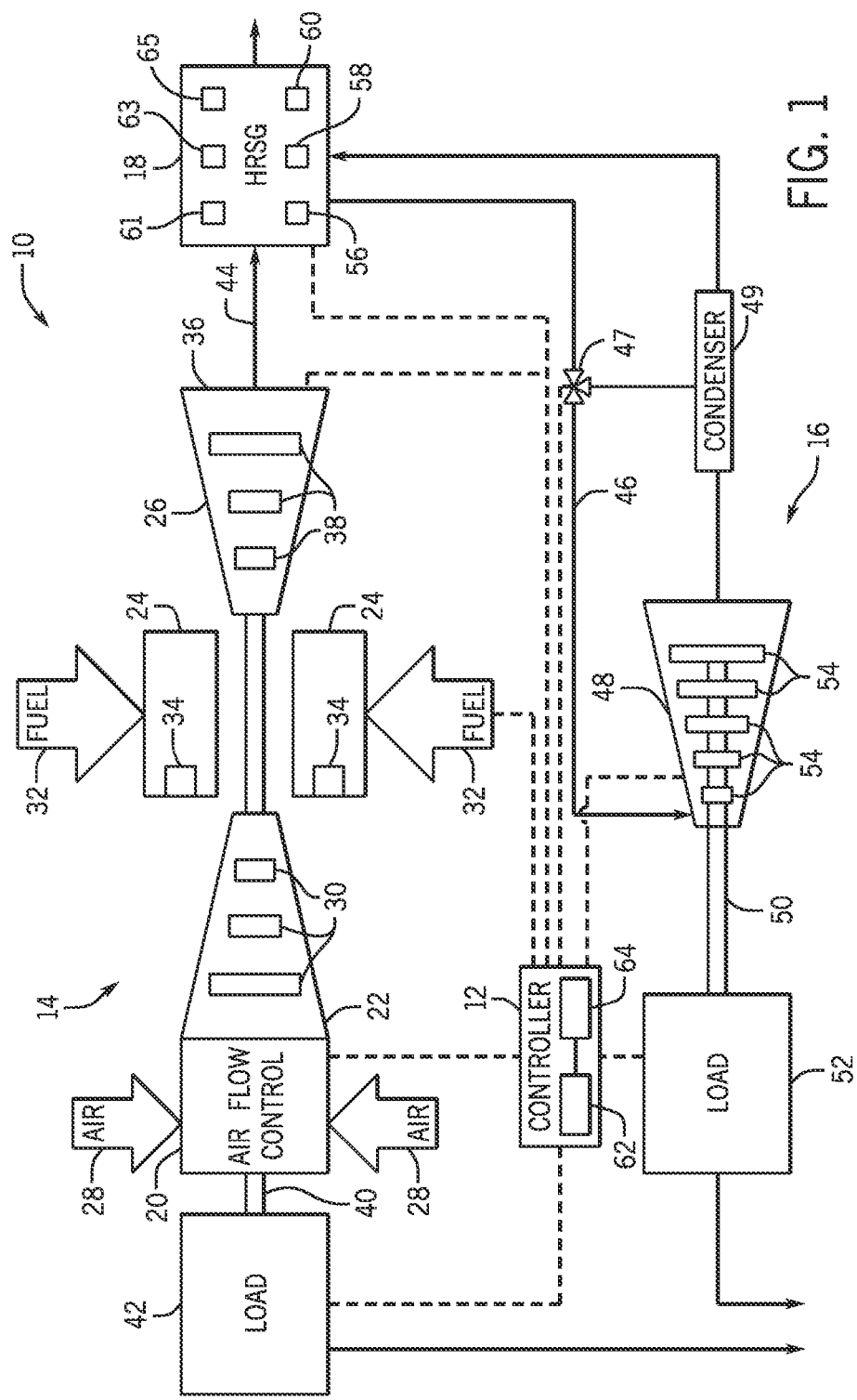
FIG. 1 is a block diagram of an embodiment of a combined cycle power plant and a controller.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to systems and methods for controlling a combined cycle power plant with setpoints inside or on a 2-dimensional (2D) surface or control area. For example, a gas turbine control may be enabled that may provide independent control of gas turbine air flow (e.g., control of inlet guide vanes intaking air into the gas turbine) and fuel flow (e.g., amount of fuel) to achieve at least two parameters. In certain embodiments, the two parameters achieved via independent control of the air flow and the fuel flow could be turbine load and exhaust temperature, turbine load and exhaust flow, exhaust flow and exhaust temperature, or any combination of two parameters that include two of the turbine load, the exhaust temperature, and the exhaust flow.

Further, certain priority modes may be used to enable improved control, for example, by giving priority to equipment life, emissions, faster startups, and the like. Additionally, operating constraints may be used to limit setpoint targets and/or rates to arrive at desired setpoints. Operating constraints may include minimum emission compliance loads (MECL); heat recovery steam generator (HRSG) limitations; balance of plant (BOP) system limitation (i.e., steam pipes, water treatment plant, condenser, feed water system, etc.), among others. For example, the combined cycle power plant may operate under MECL restrictions, which would result in control of the gas turbine system to comply with emissions requirements when the load is above a threshold level.

The system and methods described below enable the creation of setpoints inside or on the operating area (e.g., 2D control area), where setpoints may include setpoints for a variety of parameters, such as load setpoints, temperature setpoints, pressure setpoints, as well as setpoint ramp rates. The setpoint ramp rates may include desired rates of change, e.g., increased or decreased rates of temperature change, pressure change, and/or load change to arrive or maintain at a given setpoint. By defining setpoints and setpoint rates, including user-configurable setpoints and setpoint rates, the techniques described herein may enable a plurality of modes of operation, such as modes that improve emissions control, modes that improve on the life of machinery, modes that improve plant startup, modes that improve part load (e.g., operating at lase than "base" or normal operations load), and modes that improve handling of undesired events (e.g., boiler trip, BOP trip, turbine(s) trip).

With the foregoing in mind and turning now to FIG. 1, the figure is a block diagram of an embodiment of a combine cycle power plant 10 with a controller 12 that enables the creation and use of setpoint and setpoint rates for control. More specifically, the controller 12 enables the combined cycle power plant 10 to operate via user or manufacturer defined setpoints and corresponding setpoint rates. For example, a user (e.g., controls or commissioning engineer) may select a desired operating area (shown in more detail below with respect to FIGS. 2-8) and create a setpoint inside or on the operating area by using graphical user interface (GUI) embodiments described herein. The controller 12 may then operate combined cycle power plant (CCPP) 10 to arrive at or to maintain the setpoint. More specifically, the controller 12 may arrive at or maintain the setpoint by respecting certain rates of change, such as temperature, pressure, flow rates, clearance (e.g., distance between rotating and stationary components) rates, and like, for example by increasing or decreasing power output from a gas turbine system 14 and a corresponding steam turbine system 16, as described in more detail below.

The combined cycle power plant (CCPP) 10 includes the controller 12, the gas turbine system 14, the steam turbine system 16, and a heat recovery steam generator (HRSG) 18. In operation, the gas turbine system 14 combust a fuel-air mixture to create torque that drives a load, e.g., an electrical generator. In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load, e.g., an electrical generator. Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air passes through the airflow control module 20, the air enters the compressor 22. The compressor 22 pressurizes the air 28 in a series of compressor stages (e.g., rotor disks 30) with compressor blades. As the compressed air exits the compressor 22, the air enters the combustor 24 and mixes with fuel 32. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, a plurality of fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the rotor disks 38. The rotation of the rotor disks 38 induces rotation of shaft 40 and the rotor disks 32 in the compressor 26. A load 42 (e.g., electrical generator) connects to the shaft 40 and uses the rotation energy of the shaft 40 to generate electricity for use by the power grid 44.

As explained above, the combined cycle power plant 10 harvests energy from the hot exhaust gases exiting the gas turbine system 14 for use by the steam turbine system 16. Specifically, the CCPP 10 channels hot exhaust gases 44 from the turbine system 14 into the heat recovery steam generator (HRSG) 18 for further energy capture. In the HRSG 18, the thermal energy in the combustion exhaust gases converts water into hot pressurized steam 46. The HRSG 18 releases the steam 46 for use in the steam turbine system 16.

The steam turbine system 16 includes a turbine 48, shaft 50, and load 52 (e.g., electrical generator). As the hot pressurized steam in line 46 enters the steam turbine 48, the steam contacts turbine blades attached to turbine rotor disks 54 (e.g., turbine stages). As the steam passes through the turbine stages in the turbine 48, the steam induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid 44. As the pressurized steam in line 46 passes through the turbine 48, the steam loses energy (i.e., expands and cools). After exiting the steam turbine 48, the steam enters a condenser 49 before being routed back to the HRSG 18, where the steam is reheated for reuse in the steam turbine system 16. It is to be noted that the HRSG 18 may include a variety of components, such as one or more boilers 56, attemperators 58, drums 60, and so on. For example, the boilers 56 may convert water into steam, while the attemperators 58 may adjust steam temperature, for example, by spraying water into the steam. Likewise, drums 60 may be used as repositories of water, steam, and the like. It is to be noted that the HRSG 18 may include other components, such as superheaters 61, deareators 63, economizers 65, and so on.

As explained above, the controller 12 enables the combined cycle power plant 10 to more flexibly control plant 10 operations by using setpoints and setpoint rates. An operator may create one or more setpoints (and related setpoint rates) inside of an operations area and the controller may then operate the plant based on the one or more setpoints. Additionally, based on an operating modality, certain control priorities may be enabled by the user or otherwise used. In one example, during startup, an exhaust 44 temperature priority may be used to enhance the life of the HRSG 18 and BOP systems. During base load operations, a turbine 14 load priority may be used to more efficiently operate the gas turbine 14. Emissions priorities may also be used, suitable for operating with minimum emission compliance loads.

The controller 12 includes a memory 62 and a processor 64. The memory 62 stores instructions and steps written in software code. The processor 64 executes the stored instructions, for example, in response to feedback from the CCPP 10. More specifically, the controller 12 controls and communicates with various components in the CCPP 10 in order to flexibly control the loading and unloading of the gas turbine system 14, and thus the loading and unloading of the steam turbine system 16. In operation, the controller 12 controls the airflow control module 20 and the consumption of fuel 32 to change the loading of the gas turbine system 14 and thereby the loading of CCPP 10 (i.e., how the CCPP 10 increases electrical power output to the grid 44). Specifically, the controller 12 adjusts the mass flow rate and temperature of the exhaust gas 44, which controls how rapidly the HRSG 18 produces steam for the steam turbine system 16, and therefore, how quickly the CCPP 10 produces electrical power using loads 42 and 52. For example, when the controller 12 increases the airflow with the airflow control module 20, it increases the amount of airflow flowing through the compressor 22, flow through the combustor 24, and flow through the turbine 26. The increase in airflow increases the mass flow rate of the exhaust gas, and thus the torque of the shaft 40. Likewise, the airflow control module 20 may be used to reduce airflow flowing through the compressor 22, through the combustor 24, and flow through the turbine 26. The decrease in airflow decreases the mass flow rate of the exhaust gas, and thus the torque of the shaft 40.

The controller 12 additionally controls fuel consumption by the gas turbine system 14. Control of the fuel 32 affects the mass flow rate through the gas turbine system 14 and the thermal energy available for the HRSG 18. For example, when the controller 12 increases fuel consumption the temperature of the exhaust gas 44 increases. The increase in the exhaust gas temperature 44 enables the HRSG 18 to produce steam at higher temperatures and pressures, which translates into more power production by the steam turbine system 16. However, when the controller 12 decreases fuel consumption there is a reduction in the temperature of the exhaust gas. Accordingly, there is less mechanical energy available to drive load 42 and less thermal energy available to produce steam for the steam turbine system 16 to drive load 52.

Figure 2:
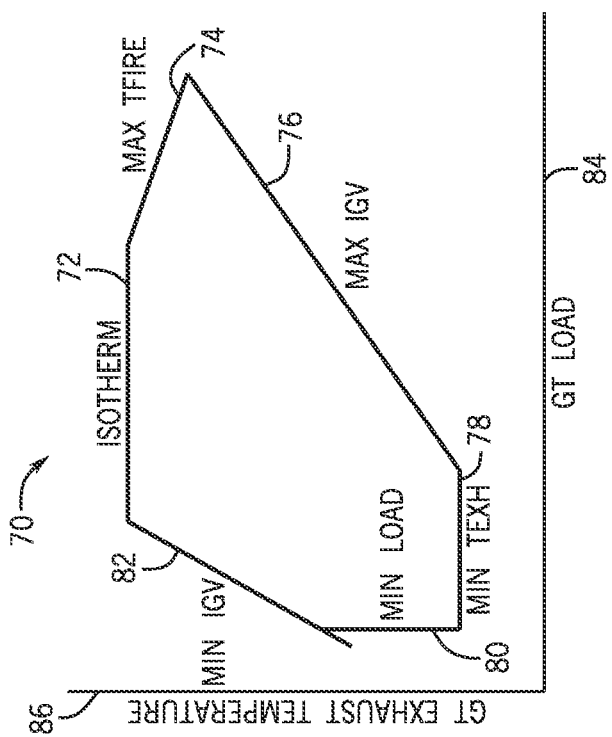
FIG. 2 is a graph illustrating embodiments of different limits that bound or create a first operating area suitable for operations of the combined cycle power plant of FIG. 1.

Turning now to FIG. 2, the figure is a graph illustrating an embodiment of an operating area or space 70 that may be used by the controller 12 in lieu of traditional load path control, or alternative to load path control. In the depicted embodiment, the operating area 70 is derived by bounds based on ISOthermal (Isotherm) limits 72 based on ISO conditions, Maximum firing temperature limits 74, maximum inlet guide vane (IGV) limits 76, minimum exhaust 44 temperature 78, minimum load limits 80, and maximum IGV limits 82. Because the operating area 70 is a gas turbine system 14 operating area, a gas turbine load x-axis 82 is provided, along with a gas turbine exhaust 44 temperature y-axis 84. In use, a setpoint may be placed anywhere inside the operating area 70, or on the limits 72, 74, 76, 78, 80, 82. Each setpoint and/or operating area may additionally include a rate of change (increasing or decreasing change) useful to move control towards the setpoint during control of the CCPP 10. Setpoints outside of the area 70 and limits 72, 74, 76, 78, 80, 82 may not be allowed by the controller 12. The operating area 70 may be derived, for example, by analyzing the design and manufacture of the various systems of the CCPP 10 to derive the limits 72, 74, 76, 78, 80, 82 that respect life cycle and operating constraints of the systems of the CCPP 10 as the gas turbine system 14 is loaded (axis 82) and the gas turbine exhaust 44 temperature rises (axis 84).

By providing for an easily visualizable operating area 70 and limits 72, 74, 76, 78, 80, 82, the user (e.g. CCPP 10 controls engineer) may observe and/or visually place a setpoint enabling operations of the CCPP 10 to provide for the desired gas turbine 14 load and a desired gas turbine exhaust 44 temperature. Indeed, setpoints in the operating area 70 may advantageously provide for control of both load (axis 82) and exhaust temperature (y 84) in combination, thus respecting limits of the HRSG 18 and BOP systems. It is to be noted that other limits may be incorporated, in addition to or in lieu of the limits 72, 74, 76, 78, 80, 82, such as pressure limits, fuel type limits, clearance limits, other temperature limits, and so on. It is also to be noted that multiple operating areas may be provided, for example, FIG. 3 depicts an embodiment of an operating area 90 that includes an x-axis 92 based on gas turbine exhaust 44 flow.

Figure 3:
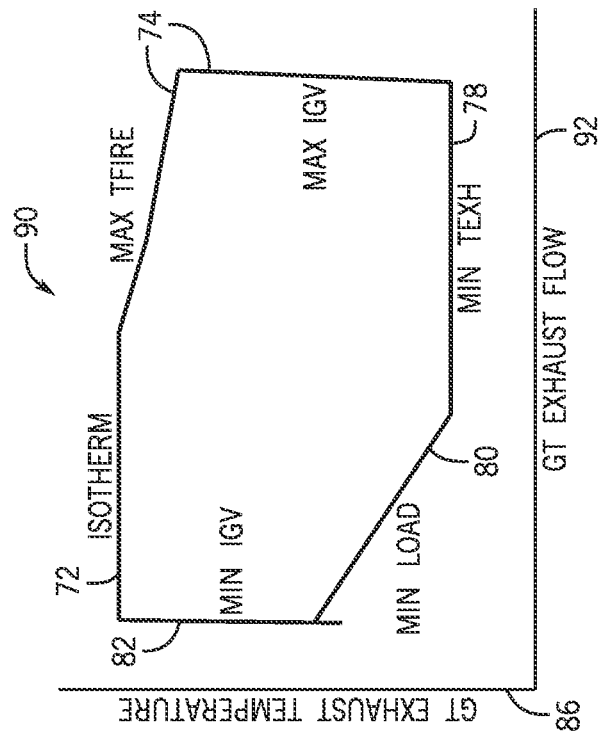
FIG. 3 is a graph illustrating embodiments of different limits that create a second operating area suitable for operations of the combined cycle power plant of FIG. 1.

In the embodiment depicted in FIG. 3, the operating area 90 is designed to operate with setpoints that control the exhaust 44 flow (e.g., x-axis 92) in combination with the exhaust 44 temperature (e.g., y-axis 84), for example, to improve life of the HRSG 18 and BOP systems. For example, during the startup of the gas turbine 14 system, it may be desired to give priority to the HRSG 18 and BOP systems by minimizing thermal stresses in the system. Accordingly, the operating area 90 may include one or more setpoints that would be used by the controller 12 during start up of the CCPP system 10 and focus on exhaust 44 flow and exhaust 44 temperature rather than on more traditional loading curves such as loading curves that follow a percent loading as a function of time (e.g., loading percent on y-axis and time on x-axis).

Because of the focus on the exhaust 44 flow (e.g., mass flow), the operating area 90 includes a shape different from the shape of the operating area 70. The shape of the operating area 90 may be derived by the shape of the limit curves 72, 74, 76, 78, 80, 82 based on using exhaust 44 flow rather than the gas turbine 14 load as the x-axis. That is, the operating area 90 may be derived, for example, by analyzing the design and manufacture of the various systems of the CCPP 10 to derive the limits 72, 74, 76, 78, 80, 82 that respect life cycle and operating constraints of the systems of the CCPP 10 as the gas turbine exhaust 44 flow increases (axis 92) and the gas turbine exhaust 44 temperature rises (axis 84). It is to be noted that other operating areas may be used, in addition or alternative to areas 70, 90, such as operating areas based on steam flow through turbine 16, load 52, and or HRSG 18 components (e.g., boilers 56, attemperators 58, drums 60). By providing for setpoint operating areas based on, for example, the limits 72, 74, 76, 78, 80, 82, the techniques described herein may enable a more flexible control of the CCPP 10 that may respect equipment life and improve CCPP 10 efficiency.

Figure 4:
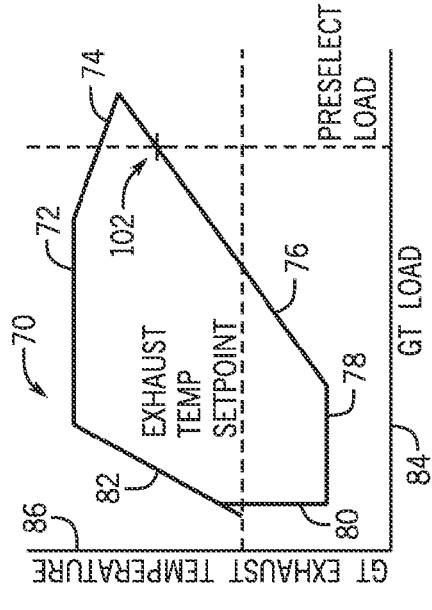
FIG. 4 is a graph depicting a first setpoint embodiment inside of an operating area of FIG. 2.
Figure 5:
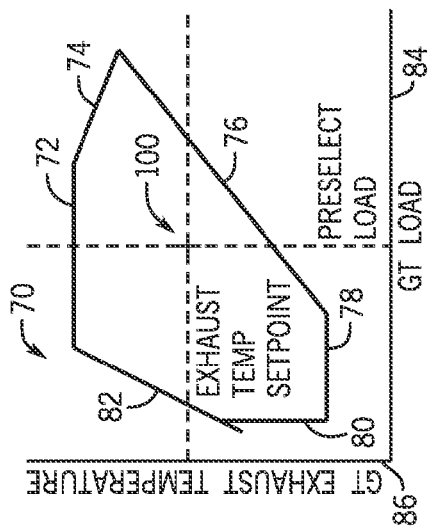
FIG. 5 is a graph depicting a second setpoint embodiment inside of an operating area of FIG. 2.
Figure 6:
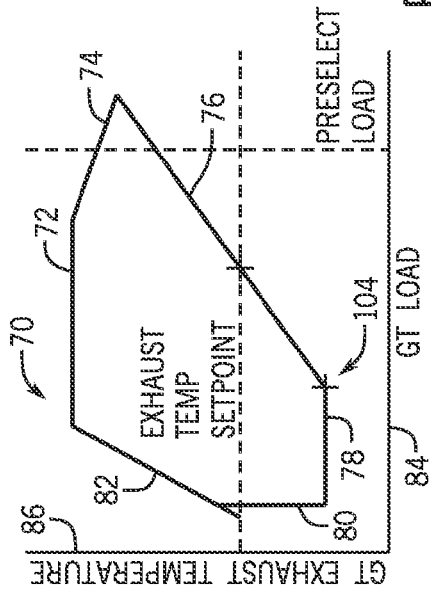
FIG. 6 is a graph depicting a third setpoint embodiment inside of an operating area of FIG. 2.

FIGS. 4, 5 and 6 depict embodiments of various setpoints created inside or on the operating area 70. Because the figures include like elements with FIG. 3, the like elements are depicted using like numbers. Turning now to FIG. 4, the figure depicts the operating area 70 and a setpoint 100. As mentioned above, setpoints, such as the setpoint 100 may be created in situ by a user or dynamically derived by the controller 12 and then executed by the controller 12 to control the CCPP 10. Indeed, the user may select an x, y point in the operating area 70 and create the setpoint 100 so that the controller 12 may then, for example, increase or decrease gas turbine 14 load to arrive at the desired setpoint 100. In some embodiments, as describe in further detail below, the user may restrict the rate at which the controller 12 arrives at the setpoint 100 from a current operating point, for example, by keeping within desired rates of change that respect certain equipment limits. For example, increasing the fuel to the gas turbine 14 will increase the gas turbine 14 load 42, but it may also increase the exhaust 44 temperature. Accordingly, the controller 12 may respect the setpoint's 100 y-axis 86 limit when arriving at the desired load. Likewise, rates of change of the exhaust 44 temperature and the loading may be respected. By moving towards or maintaining the setpoint 100, an improved control technique may be provided by the controller 12, that may more flexibly control the CCPP 10, and that respects certain limits, thus improving equipment life and emissions.

Turning now to FIG. 5, the figure depicts an embodiment of the operating area 70 and a setpoint 102. As mentioned above, setpoints, such as the setpoint 102 may be created in situ by a user and then applied by the controller 12 to control the CCPP 10. In the depicted embodiment, the setpoint 102 is shown as disposed on the limit curve 76 (e.g., maximum IGV limit curve). Indeed, the setpoints may not only be disposed inside the areas 70, 90, as shown in FIG. 4, but additionally or alternatively, on any of the limits 72, 74, 76, 78, 80, 82. For example, as shown in FIG. 6, a setpoint 104 may be disposed on the limit 76 (e.g., maximum IGV limit curve) and the limit 78 (e.g., minimum exhaust 44 temperature limit curve). Should a setpoint be placed outside of the limits 72, 74, 76, 78, 80, 82 a GUI may alert the user that such a setpoint is not allowed, thus eliminating operations in areas deemed undesirable.

Figure 7:
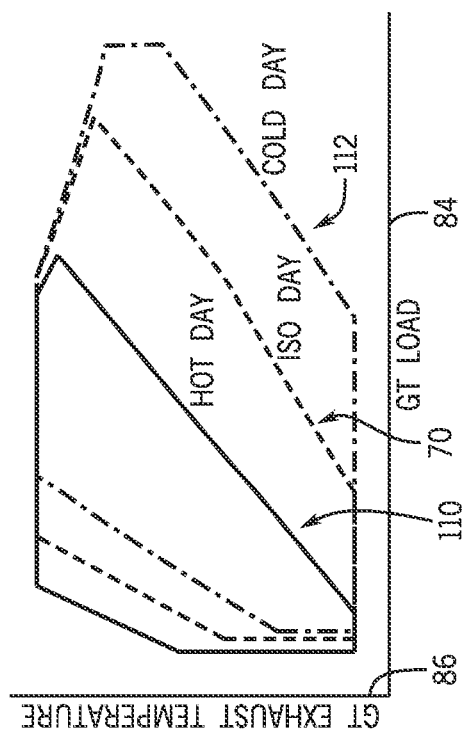
FIG. 7 is a graph illustrating embodiments of various operating areas based on ambient conditions.

The techniques described herein additionally may account for changes in ambient conditions. For example, as shown in FIG. 7, an embodiment of three operation areas 70, 110, and 112 are shown. In the depicted embodiment, the operating area 70 may correspond to an International Standards Organization (ISO) ambient day. More specifically, the ISO day 70 may include limits 72, 74, 76, 78, 80, 82 that may have been derived, for example, by the manufacturer to operate more efficiently during a day with a given temperature range (e.g., 60E-80F), a given humidity (e.g., 40%-60% humidity), and a given barometric pressure (e.g., 29.92 inches of mercury) at a given altitude (e.g., sea level). Based on the ISO ambient day operating area 70, the CCPP may derive other operating areas 110, 112. For example, the CCPP system 10 may include ambient temperature, pressure, and/or humidity sensors suitable for providing ambient readings related the weather changes. The controller 12 may then account for weather changes by dynamically changing the ISO day operating area 70, for example, by reshaping the limit curves 72, 74, 76, 78, 80, 82 based on the received ambient readings.

During a hot day, the controller 12 may provide for the hot day operating area 110. During the hot day 110, conditions may be such that the maximum IGV limit 76 may be smaller when compared to the maximum IGV limit 76 that may be used during the ISO day operating area 70. Likewise, during the cold day operating area 112, conditions may be such that the maximum IGV limit 76 may be larger when compared to the maximum IGV limit 76 that may be used during the ISO day operating area 70. The other limits 74, 76, 78, 80, 82 may be similarly adjusted to account for hotter operations 110 and/or colder operations 112. As mentioned above, atmospheric pressure and/or ambient humidity may be similarly accounted for. In use, the controller 12 may enable setpoints to operate in the new areas 110, 112 because of changes in ambient conditions, thus further enhancing control flexibility.

In one embodiment, setpoints that may have been created and saved based on one of the operations areas 70, 110, 112 may be automatically repositioned by the controller 12 based on the current ambient conditions. For example, colder days may enable moving setpoints further away from the origin point (e.g., from point [0,0]), while warmer days may enable moving the setpoints closer to the origin point. In another embodiment, saved setpoints may not be repositioned, but setpoints falling outside of the limits 72, 74, 76, 78, 80, 82 may result in a warning to the user and may not be used. Accordingly, the controller 12 may account for ambient changes and operate the CCPP system 10 more efficiently. It is to be noted that the graphs depicted in FIGS. 2-7 may be provided to the user via a GUI, such as a GUI described in more detail below with respect to FIGS. 10 and 11.

Figure 8:
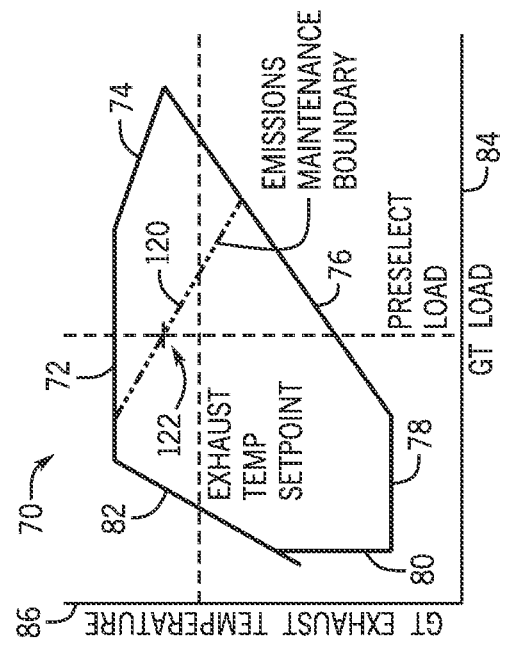
FIG. 8 is a graph illustrating an embodiment of an emissions maintenance boundary.

FIG. 8 is a diagram depicting an embodiment of the operating area 70 including a boundary 120 and a setpoint 122. In some circumstances, it may be desirable to enforce a boundary, such as the boundary 120, in addition to the limits 72, 74, 76, 78, 80, 82. In the depicted embodiment, the boundary 120 is an emissions maintenance boundary 120 useful in maintaining emissions below certain desired levels. Accordingly, the controller 12 may now operate at temperatures higher than the boundary 120 to minimize emissions production, e.g., $CO_2$ production. Setpoints on the boundary curve 120 or above the boundary curve 120, such as setpoint 122, are allowed. Setpoints below the boundary curve 120 but still inside the limits 72, 74, 76, 78, 80, 82 may not be allowed when the user selects operations based on the boundary 120. Certain overrides may be provided for when the controller 12 is commanded to apply the boundary 120, such as when there is a CCPP 10 shutdown, there is a protective load runback, there is a trip, and so on, disabling the use of the boundary 120.

Other boundaries may be provided such as a maximum exhaust 44 flow boundary that bounds the exhaust 44 temperature to provide for temperatures below the maximum exhaust 44 flow boundary. Accordingly, exhaust 44 flow may be more efficiently controlled, and systems downstream of the exhaust 44 may experience increased life. The maximum exhaust 44 flow boundary (and the boundary 120) may be user defined by entering an array of points defining a curve on the operating area 70. By providing for boundaries that control operations on, below, and/or above the boundaries, the techniques described herein provide additional control flexibility of the CCPP 10 system.

Figure 9:
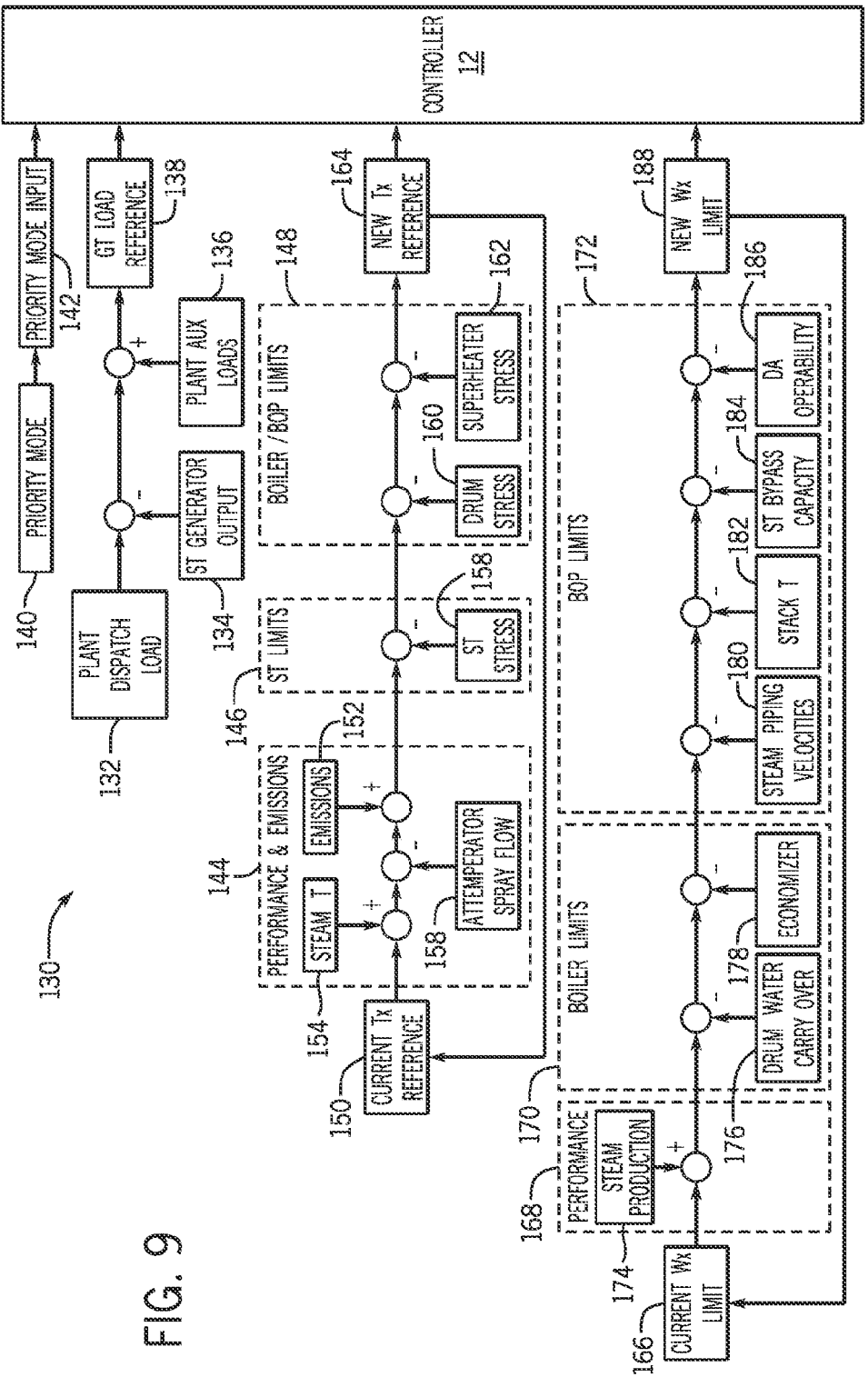
FIG. 9 is a block diagram of an embodiment of a process useful in controlling the combined cycle power plant via setpoints and priorities.

FIG. 9 is a block diagram of an embodiment of a control process 130 that may be used with the techniques described herein (e.g., operating areas, setpoints, setpoint rates, and priorities) to more flexibly control the CCPP system 10. In the depicted embodiment, the process 130 may provide for priority based, independent control of at least the turbine system 14 loading and exhaust 44 temperature. Indeed, in one embodiment, the process 130 may prioritize certain adjustments and apply the prioritized adjustments to control the CCPP 10. The process 130 may be implemented as computer instructions stored in tangible non-transitory machine readable medium (e.g., memory 62) and may be executed by the processor 64. The process 130 may additionally or alternatively use one or more setpoints (e.g., gas turbine 14 load setpoint, exhaust 44 temperature setpoint) to control the CCPP 10. Each setpoint may have a corresponding increasing rate of change and decreasing rate of change. Accordingly, the controller 12 may move towards the setpoints from a current reference point at the corresponding rates of change to control the CCPP 10. For example, the controller 12 may increase fuel to the turbine system 14, change the air-fuel ratio of the turbine 14, open or close inlet guide vanes, and so on, to move towards the setpoints.

In the depicted embodiment, the process 130 may receive a current plant dispatch load 132 that may result, for example, in a desired electrical power production of the CCPP system 10. The process 130 may then adjust the load 132 by subtracting a current steam turbine 16 generator output 134 (e.g., electric power being currently produced via the generator or load 52) from the dispatch load 132 and may then add a plant auxiliary loads 136 (e.g., loads for operating pumps, compressors, blowers, and the like, of the CCPP system 10). Accordingly, a more accurate gas turbine 14 load reference 138 may be derived. The load reference 138 may then be provided to the controller 12 to control further operations.

In the depicted embodiment, the process 130 may use a priority mode 140 to prioritize control of the CCPP system 10. For example, the process 130 may apply the priority mode 140 during operations with our without using the setpoints and setpoint rates by giving higher or lower weight to certain adjustments as described in more detail below. The priority mode 140 may include, for example, an exhaust 44 temperature priority, a turbine 14 load priority, an emissions priority, and so on. In operations, the user may provide the controller 12 with a priority mode input 142 (e.g., exhaust 44 temperature priority, turbine 14 load priority, emissions priority, or a combination thereof), or the priority mode input 142 may be automatically derived based on current operations of the CCPP system 10 (e.g., startup operations, base load operations, shutdown operations).

Adjustments 144, 146, and/or 148 may then be used to tune a current exhaust 44 temperature reference 150. For example, if the priority mode input 142 is the exhaust 44 temperature priority, then the boiler/BOP limits adjustments 148 may be given priority over the steam turbine limits adjustments 146 and the performance and emissions adjustments 144. If the priority mode input 142 is the turbine 14 load priority, then the performance and emissions adjustments 144 may be given priority over the steam turbine limits adjustments 146 and the boiler/BOP limits adjustments 148. If the priority mode input 142 is the emissions priority, then the process 130 may give more priority to the performance and emissions adjustment, and more particularly, to an emissions adjustment 152. By prioritizing the aforementioned adjustments, improved control suitable for further considering equipment and operational priorities may be achieved.

In use, the current exhaust 44 temperature reference 150 may be first tuned by adding the steam temperature adjustments 154, subtracting attemperator 58 spray flow adjustments 156 and then adding the emissions adjustment 152. Accordingly, performance and emissions may be fine-tuned via adjustments 144. The current exhaust 44 temperature reference 150 may then be further adjusted by subtracting a steam turbine 16 stress adjustment 158. The stress adjustment 158 may account for thermal stresses experienced by the steam turbine 16, and may reduce the current exhaust 44 temperature reference 150 to lower stresses in the steam turbine 16. The current exhaust 44 temperature reference 150 may then be further adjusted by subtracting a drum stress adjustment 160 and a superheater stress adjustment 162. Subtracting adjustments 160 and 162 may reduce drum 60 stresses and superheater stresses respectively, thus further maximizing the life of the aforementioned systems. Once adjusted, a new exhaust 44 temperature reference 164 may be provided to the controller 12 for use in moving controlling the gas turbine 14. The new temperature reference 164 may be used in a feedback loop, as shown, thus becoming the current exhaust 44 temperature reference 150, which may then undergo further adjustments 144, 146, 148.

The priority mode 140 may be additionally or alternatively used to adjust a current Wx (e.g., exhaust flow) limit 166. Accordingly, the process 130 may apply performance adjustments 168, boiler limits adjustments 170, and/or BOP limits 172 for further fine-tune the limit 166. For example, the current Wx limit 166 may be adjusted to improve steam production performance via the adjustments 168, improve life of the boiler 56 via the adjustments 170, and/or improve BOP life via the adjustments 172.

In operations the current Wx limit 166 may be increased by adding a steam production adjustment 168, based on steam mass flow currently being produced. The current Wx limit 166 may then be further adjusted by subtracting a drum water carry over adjustment 176. The adjustment 176 may reduce the Wx limit 166 by adjusting for any carry over (e.g., solid, liquid, or gaseous contaminants) currently in place. The Wx limit 166 may additionally be adjusted by subtracting a economizer adjustment 178, such as adjustments based on level control (e.g., drum level) valve flashing. By using adjustments 176 and/or 178, boiler 56 limits may be further respected.

The Wx limit 166 may be further adjusted by subtracting a steam piping velocities adjustment 180, a stack temperature adjustment 182, a steam turbine bypass capacity 184, and a deareator (DA) operability adjustment 186. The adjustment 180 may fine-tune the limit 166 by reducing the limit 166 due to piping constraints, e.g., velocity constraints of piping in the HRSG 18. Likewise, the adjustment 182 may further tune the limit 166 by reducing the limit 166 due to heat in the stack. Similarly, the adjustment 182 may reduce the Wx limit 166 due to Deareator operations, for example, operations that remove oxygen and dissolved gases from the feedwater. Once the adjustments 168, 170, and/or 172 are applied the process 130 may derive a new Wx limit 188, which may be provided to the controller 12. The controller 12 may then apply the Wx limit 188, for example, when controlling the CCPP 10. The Wx limit 188 may then be used in a feedback loop, as illustrated, and become the Wx limit 166 for further cycled use.

Figure 10:
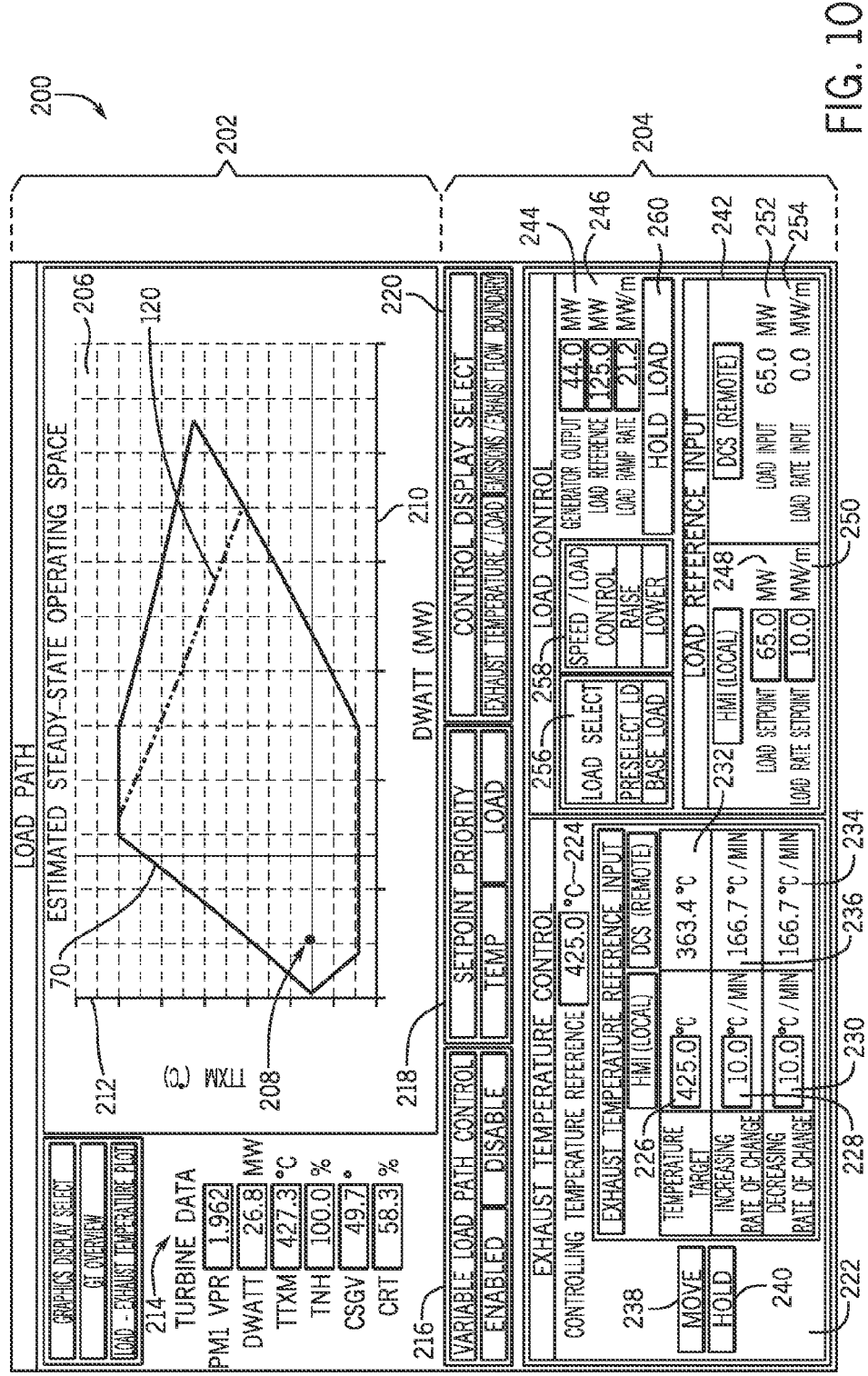
FIG. 10 is a view of and embodiment of a first graphical user interface screen useful in controlling the combined cycle power plant of FIG. 1.

The priority input 142 may be used to prioritize any of the adjustments 144, 146, 148, 168, 170, 172, or combination thereof. Indeed, based on user selection of the input 142 or on automatic derivation of the input 142, the process 130 may increase or decrease adjustment factors to provide for more efficient operations suitable for improving equipment life. The techniques described herein additionally provide for improve graphical user interfaces (GUIs), as describe in more detail below with respect to FIGS. 10 and 11. For example, FIG. 10 illustrates an embodiment of a GUI screen 200 having screen portions 202, 204. The screen 200 may be implemented as computer instructions stored in tangible non-transitory machine readable medium (e.g., memory 62) and may be executed by the processor 64. The screen portion 202 includes a graph portion 206 showing the operating area 70, for example, to enable the user to visualize and/or position a setpoint 208. The portion 202 also shows the emissions maintenance boundary 120 so that user may more easily view the location of the boundary 120 with respect to axis 210 (e.g., load in Watts), and axis 212 (e.g., exhaust 44 temperature in Celsius or Fahrenheit). Also depicted are operational turbine data 214, that may include various operations parameters (e.g., temperature, pressure, flow rate, flow mass, clearance, fuel type, power production, and so on) as shown. As mentioned above, the user may select the setpoint 208, and then observe the parameters 214 as the controller 12 moves the CCPP 10 operations towards the setpoint 208.

The portion 204 includes a flexible load path (FLP) control 216. Enabling the flex load path control 216 may enable the flexible control described herein, such as the setpoint and setpoint rates control. A setpoint priority control 218, is also provided, that may be used to enter the priority input 142 manually. In the depicted embodiment, the priority input 142 shown enabled is the temperature priority input, but other priority inputs 142 may also be used, e.g., load, exhaust flow. A control display select control 220 is also shown. During operations the user may activate the control 220 for example, to display data related to exhaust 44 temperature/load, and/or emissions/exhaust flow boundaries in the section 202.

Also depicted is a temperature control section 222. Advantageously, the user may view a temperature target via a temperature reference control 224 included in the section 222. Likewise, the user may enter the temperature target by inputting the setpoint 208 and/or inputting the temperature target via a temperature target input control 226. Likewise, an increasing rate of change limit for the temperature reference may be entered via an increasing rate of change temperature control 228. Similarly, a decreasing rate of change limit for the temperature reference may be entered via a decreasing rate of change temperature control 230. It is to be noted that the inputs 226, 228, 230 are human machine interface (HMI) inputs, but other techniques, such as remote inputs through a distributed control system (DCS) may be used to provide inputs to the controller 12. Accordingly, DCS inputs 232, 234, 236 are provided, corresponding to HMI inputs 226, 228, 230.

In operations, the controller 12 may thus move or hold towards the reference temperature 224 at the desired rates 228, 230. When it is desired to command the controller 12 to move, the user may actuate the move control 238, and when it is desired to command the controller 12 to hold, the user may actuate the control 240. Accordingly, temperature may be more easily controlled and visualized.

A load control section 242 is also depicted, useful in controlling gas turbine 14 loads. For example, a load reference control 244 may depict the current load in megawatts, while a load ramp rate control 246 may depict a rate of change desired for the loading and/or unloading of the gas turbine 14. In addition to or alternative to using the setpoint 208, the user may enter load setpoints via an input control 248, and a desired rate of change via a rate input control 250. As mentioned earlier, a DCS may send remote commands to the controller 12, including a remote load setpoint input 252, and a desired load rate of change remote input 254. Further depicted in the load control section 242 is a load select control 256, a speed/load control 258, and a hold load control 260. The load select control 256 may be used to select between a baseload or a preselected load (e.g., less or more than the baseload). The speed/load control 258 may be used to raise or to lower the load, and the hold load control 260 may be used to maintain or otherwise hold at the desired load reference 244. By providing for the GUI screen 200, the techniques described herein may enable a more efficient setpoint 208 control and visualization.

Figure 11:
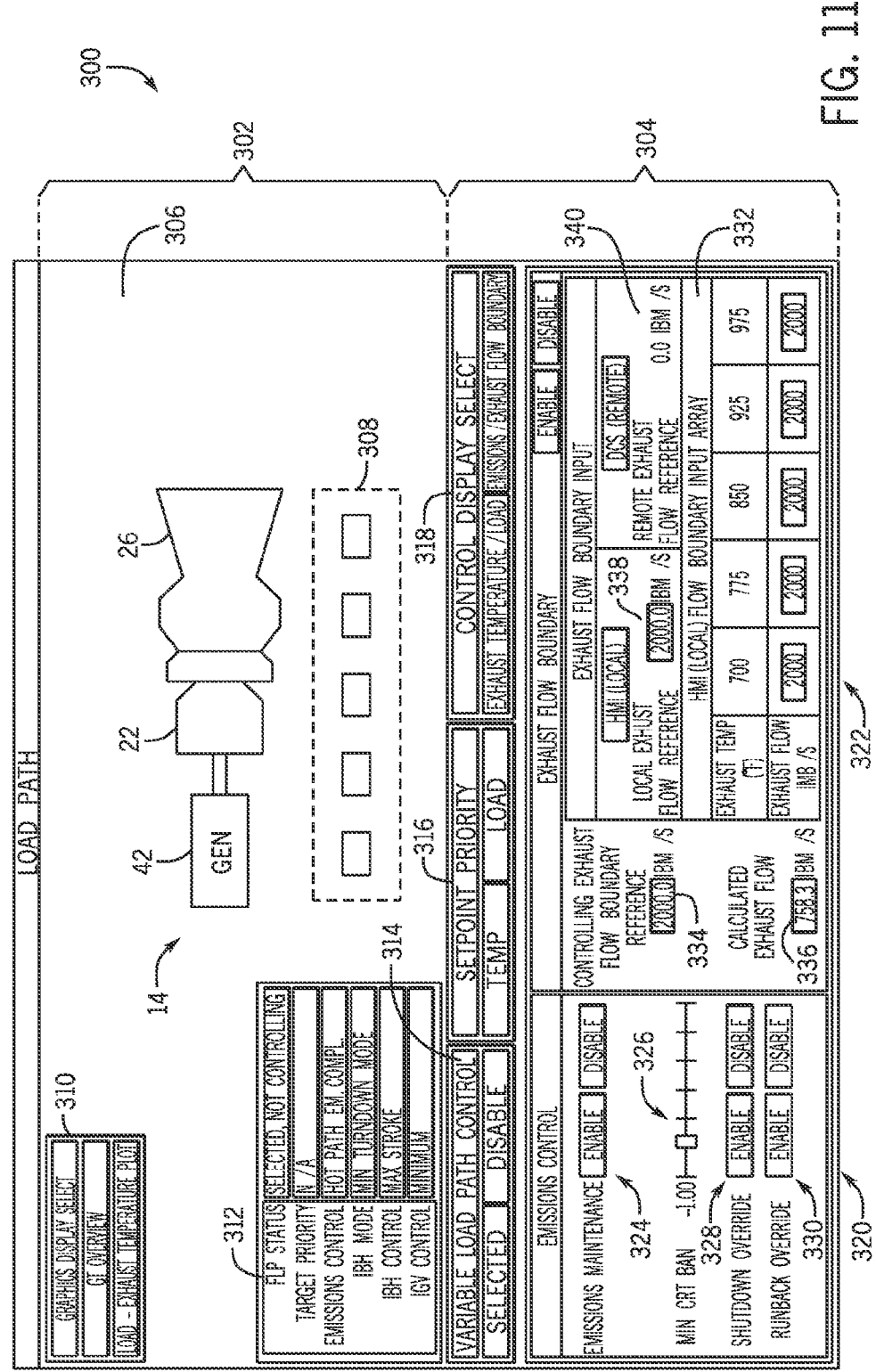
FIG. 11 is a view of and embodiment of a second graphical user interface screen useful in controlling the combined cycle power plant of FIG. 1.

FIG. 11 illustrates a GUI screen 300 having screen portions 302, 304. The screen 300 may be implemented as computer instructions stored in tangible non-transitory machine readable medium (e.g., memory 62) and may be executed by the processor 64. The screen portion 302 includes a view 306 showing a graphical representation of the gas turbine system 14, including load (e.g., generator) 42, compressor 22, and/or turbine 26. Other components of the system 14 may also be shown. The view 306 also includes controls 308 that may show various parameters of the gas turbine system 14, including but not limited to temperature, pressure, fuel type, flow rate, flow mass, clearance, power production, speed, and loading, and so on. Graphic select controls 310 are also included, suitable for changing between various views, such as view 306 and 206 (shown in FIG. 10).

A status control 312 is also provided, useful in display a variety of status information, such as the use of setpoints for control (e.g., FLP status), the priority selected (e.g., priority mode 140 shown in FIG. 9), a type of emissions control, and properties related to inlet bleed heat (IBH) control and IGV control. The GUI screen 300 also includes controls 314, 316, and 318, suitable for enabling and disabling the flexible load path, a temperature priority (e.g., one priority available in the priority modes 140), and a display selection (e.g., selection of a display for screen portion 302), respectively. For example, control 316 may be used to set the priority input 142 as desired.

Additionally, the screen portion 304 includes an emissions control area 320 and an exhaust flow boundary control area 322. The emissions control area 320 may further include an emissions maintenance control 324 useful in enabling and disabling the application of the emissions boundary 120 (shown in FIG. 8) during control operations. Also shown is a bias control 326 that may be used to provide for deviations or bias from the emissions boundary 120. More specifically, the bias control 326 provides for a certain amount of deviation from the emissions boundary 120. The deviation may be in percentages (e.g., −0.1%, −0.5%, −1%, 1%, 0.5%, 0.1%), in temperature ranges (e.g., between −10° C. to 10° C., −20° C. to 20° C.), or a combination thereof. By biasing a desired amount, a more customized control when using the emissions boundary 120 may be provided. A shutdown override control 328 and a runback override control 330 are also provided. The override controls 328, 330 may be used, for example, to disable the flexible load path control (e.g., control using setpoints and rates, and/or priority modes) during a CCPP 10 shutdown or during runback conditions (e.g., overspeed conditions), respectively.

The exhaust flow boundary control area 322 may be used, for example, to define an exhaust flow boundary curve and then to use the defined curve during control as an additional boundary, much like the use of the boundary 120. To define the exhaust flow boundary curve, an array control 332 is provided, suitable for entering an array of points (e.g., exhaust temperature versus exhaust flow points). The points may be used to define the exhaust flow boundary curve over a two-dimensional graph having exhaust temperature as a first axis and exhaust flow as a second axis. Indeed, the user may define a desired exhaust flow boundary curve to enable control by enabling the controller 12 to respect the boundary of such a curve. An exhaust flow boundary reference control 334 is also provided, useful in visualizing the current exhaust flow boundary, and a calculated exhaust flow control 336 is further provided, useful in visualizing the exhaust flow as calculated by the controller 12. Additionally, a HMI input exhaust flow reference control 338 is provided, enabling the local user to input exhaust flow reference values. Likewise, a DCS input exhaust flow reference control 340 is also provided, enabling a remote user to input the exhaust flow reference values.

Figure 12:
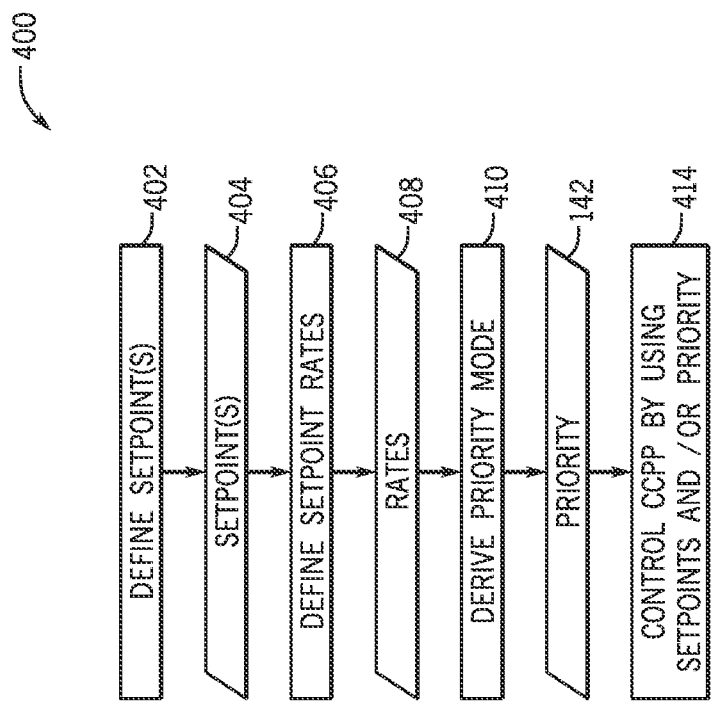
FIG. 12 is a flowchart of an embodiment of a process useful in creating setpoints and priorities and using the setpoints and priorities for control of the combined cycle power plant of FIG. 1.

Turning now to FIG. 12, the figure is a flowchart of an embodiment of a process 400 that may be used to control the CCPP 10. The process 400 may be implemented as computer instructions stored in tangible non-transitory machine readable medium (e.g., memory 62) and may be executed by the processor 64. The process 400 may define (block 402) one or more setpoints 404, as described above, to control the CCPP 10. For example, the GUI screen 200 may be used to enter the setpoints 404. The process 400 may then define (block 406) one or more setpoint rates 408 corresponding to the setpoints 404, such as desired rates of increase and/or decrease as the controller 12 moves towards or holds the setpoints 404.

The process 400 may then derive (block 410) the priority mode to be used in adjusting control, resulting in a priority input 142. Once the setpoints 404, rates 408, and priority inputs 142 are created, the process 130 may then control (block 414) the CCPP. As mentioned earlier, the process 400 may move towards the setpoints 404 at the desired rates 406, while adjusting control via the priority input 142.

Technical effects of the invention include the ability start a combined cycle power plant in less time, and within operational constraints (e.g., HRSG constraints, MECL limits, balance of plant system limitations, etc.). Specifically, the disclosed embodiments illustrate a controller capable of loading a gas turbine engine system in a combined cycle power plant using setpoint and setpoint rates Moreover, the controller enables the combined cycle power plant to flexibly operate within operational areas bounded by limits, such as emissions standards, HRSG constraints, balance of plant system limitations, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a gas turbine system configured to produce power by combusting a fuel; and
a controller configured to control the gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimensional surface area or on the limits, wherein the controller is configured to control the gas turbine by adjusting a gas turbine fuel flow, a gas turbine airflow, or a combination thereof, to maintain the setpoint inside the 2-dimensional surface area or on the limits, and wherein the controller is configured to display the operating 2-dimensional surface area on a graphical user interface (GUI) screen, wherein the limits comprise an ISOthermal limit, a maximum firing temperature limit, a maximum inlet guide vane (IGV) limit, a minimum exhaust temperature limit, a minimum load limit, or a combination thereof.

2. The system of claim 1, wherein the controller is configured to control the gas turbine system via the operating 2-dimensional surface area and the setpoint by independently controlling the gas turbine air flow and the gas turbine fuel flow to cause the gas turbine system to provide for a first gas turbine condition and a second gas turbine condition, wherein the first and the second gas turbine conditions comprise a gas turbine load, a gas turbine exhaust temperature, a desired gas turbine exhaust flow, or a combination thereof.

3. The system of claim 1, wherein the operating 2-dimensional surface area is comprises a y-axis having a gas turbine exhaust temperature and an x-axis, and the x-axis comprises a gas turbine load or a gas turbine exhaust flow.

4. The system of claim 1, comprising a combined cycle power plant (CCPP) having the gas turbine system, wherein the controller is configured to control the gas turbine system by moving conditions of the CCPP towards the setpoint or by holding conditions of the CCPP near setpoint.

5. The system of claim 4, wherein the CCPP comprises a heat recovery steam generator (HRSG) in fluid communication with the gas turbine system, wherein the HRSG is configured to generate a steam using heat from an exhaust gas from the gas turbine system.

6. The system of claim 5, wherein the conditions of the CCPP that the controller moves towards the setpoint comprise a gas turbine exhaust temperature, a gas turbine load, a gas turbine exhaust flow, a CCPP emissions, a HRSG steam production, a steam turbine load, or a combination thereof.

7. The system of claim 1, wherein the controller is configured to move towards the setpoint or to hold near the setpoint by respecting a setpoint increase rate and a setpoint decrease rate.

8. The system of claim 1, comprising an ambient sensor communicatively coupled to the controller, wherein the controller is configured to change a shape of the operating 2-dimensional surface area based on a reading from the ambient sensor.

9. The system of claim 1, wherein the controller is configured to operate the gas turbine system by applying a priority mode, wherein the priority mode adjusts a gas turbine temperature reference, an exhaust flow reference, a gas turbine load reference, or a combination thereof, based on a priority mode input.

10. The system of claim 1, comprising an emissions maintenance boundary disposed in the operating 2-dimensional surface area, wherein the controller is configured to control operations of the gas turbine system while respecting the emissions maintenance boundary.

11. A tangible non-transitory machine readable medium, comprising:
   instructions for controlling a gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimensional surface area or on the limits; and
   instructions for displaying a graphical user interface (GUI) screen having the operating 2-dimensional surface area, wherein the instructions for controlling the gas turbine comprise instructions to control the gas turbine by adjusting a gas turbine fuel flow, a gas turbine airflow, or a combination thereof, to maintain the setpoint inside the 2-dimensional surface area or on the limits, wherein the limits comprise an ISOthermal limit, a maximum firing temperature limit, a maximum inlet guide vane (IGV) limit, a minimum exhaust temperature limit, a minimum load limit, or a combination thereof.

12. The medium of claim 11, wherein the instructions for controlling comprise instructions for applying a priority mode to prioritize control adjustments.

13. The medium of claim 12, wherein the instructions for controlling comprise:
   instructions for controlling generation of a steam via a heat recovery steam generator (HRSG) using the exhaust gas from the gas turbine system;
   instructions for controlling a steam temperature of the steam based on moving or holding an exhaust gas temperature towards the setpoint.

14. A method, comprising:
   controlling a gas turbine system via an operating 2-dimensional surface area and a setpoint, wherein the operating 2-dimensional surface area comprises a plurality of limits defining bounds for the operating 2-dimensional surface area, and wherein the setpoint is configured to be disposed inside the operating 2-dimensional surface area or on the limits; and
   displaying the operating 2- dimensional surface area on a graphical user interface (GUI) screen, wherein the controlling the gas turbine comprises adjusting a gas turbine fuel flow, a gas turbine airflow, or a combination thereof, to maintain the setpoint inside the 2-dimensional surface area or on the limits, wherein the limits comprise an ISOthermal limit, a maximum firing temperature limit, a maximum inlet guide vane (IGV) limit, a minimum exhaust temperature limit, a minimum load limit, or a combination thereof.

15. The method of claim 14, wherein controlling comprises:
   controlling generation of a steam via a heat recovery steam generator (HRSG) using the exhaust gas from the gas turbine system; and
   controlling a steam temperature of the steam based on moving or holding an exhaust gas temperature towards the setpoint.

16. The method of claim 14, wherein controlling comprises applying a priority mode to prioritize control adjustments.

17. The method of claim 14, comprising changing a shape of the operating 2-dimensional surface area based on a reading from an ambient sensor configured to sense ambient conditions of the gas turbine system.

* * * * *